UNITED STATES PATENT OFFICE.

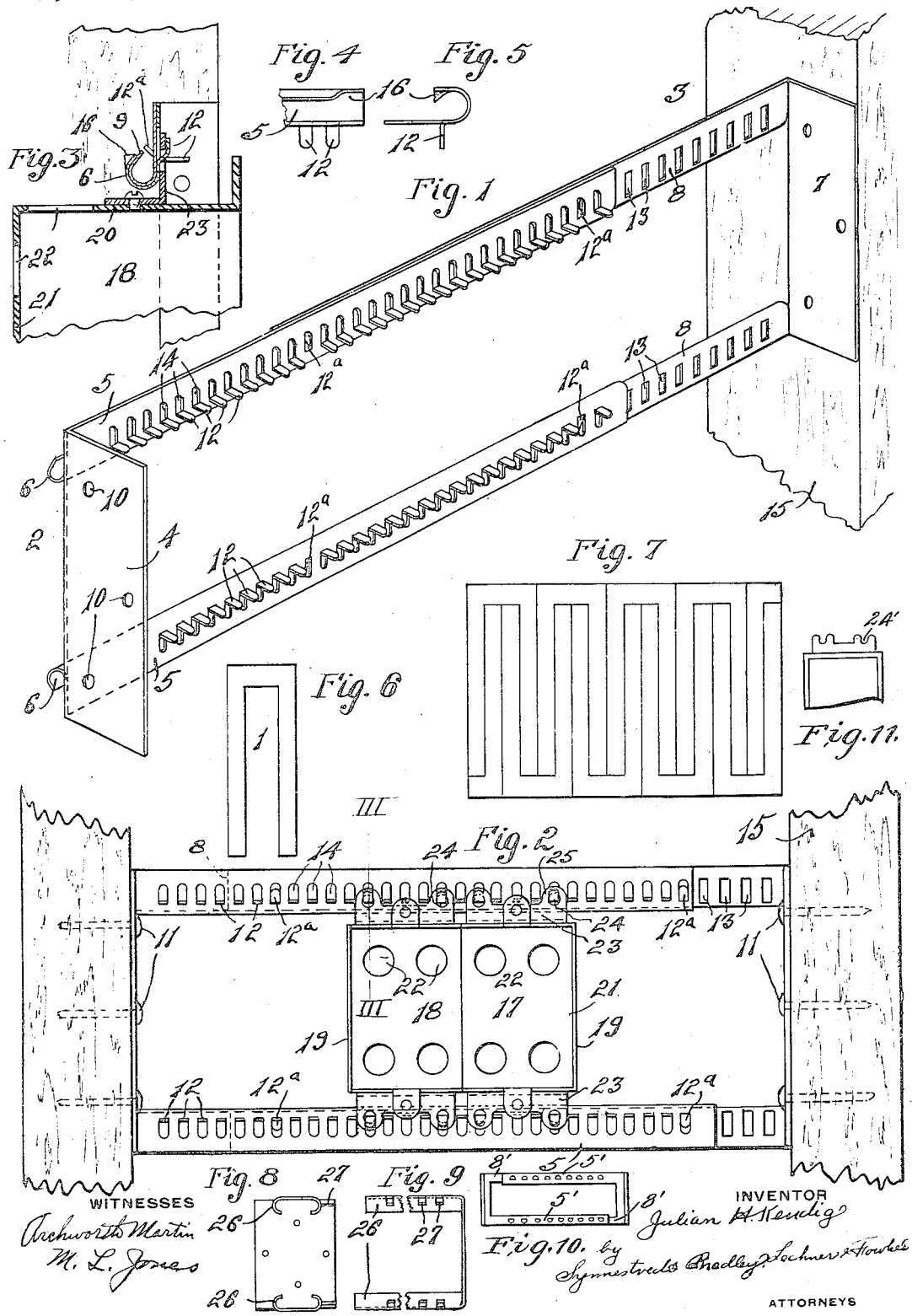

JULIAN H. KENDIG, OF PITTSBURGH, PENNSYLVANIA.

BRACKET FOR ELECTRICAL APPARATUS.

1,288,024.

Specification of Letters Patent.  Patented Dec. 17, 1918.

Application filed March 11, 1915. Serial No. 13,632.

*To all whom it may concern:*

Be it known that I, JULIAN H. KENDIG, a citizen of the United States, residing at Pittsburgh, in the county of Allegheny and State of Pennsylvania, have invented certain new and useful Improvements in Brackets for Electrical Apparatus, of which the following is a specification.

This invention relates to brackets for supporting electrical apparatus, and more particularly to that class of brackets for supporting switch terminal and other boxes used for retaining electrical apparatus used in the walls of a house in connection with the electric lighting and power systems installed therein, and has for its principal objects the provision of brackets wherein the material thereof is metal; the provision of a bracket that is adjustable to different lengths so that it may readily be installed between wall studding of various spacings; the provision of a bracket having suitable means thereon for securing the electrical apparatus to the bracket in any desired position thereon; the provision of a bracket adapted to receive and support a plurality of switch or terminal boxes at the same time and hold them in "ganged" position without the assistance of the usual "ganging" devices found on present switch boxes; the provision of a bracket wherein the boxes are secured to the bracket without the use of screws or nails, but are retained thereon by certain parts of the bracket; the provision of a bracket that is stamped from sheet metal which operation is an inexpensive process of manufacture; the provision of a bracket wherein the parts of the bracket are secured together without the use of clamping means other than those formed on the bracket; the provision of a bracket having means thereon for indicating the proper position the bracket should occupy with respect to the wall studding that the box will occupy the proper position with respect to the wall surface; the provision of a bracket that may be stamped from a plate of sheet metal without any waste of material; the provision of a bracket that is strong, rigid, durable and inexpensive to manufacture, and such other objects as may hereinafter appear. One embodiment of the invention together with a modified form of the device, is shown in the accompanying drawings wherein—

Figure 1 is a perspective view of the bracket showing one end secured to the wall studding; Fig. 2 is a front view of the bracket mounted between two pieces of wall studding and carrying thereon a couple of switch or terminal boxes in "ganged" position; Fig. 3 is a transverse section on the line III—III of Fig. 2; Fig. 4 is a plan view of the end portion of one of the arms or leaves of the bracket; Fig. 5 is an end view of the piece shown in Fig. 4; Fig. 6 is a plan view of the blank from which the bracket members are formed; Fig. 7 is a plan diagram showing how the blanks are formed from a single sheet with a minimum of waste; there being no waste if a continuous sheet be used; Fig. 8 is an end view of a modified form of bracket formed from a straight strip of sheet metal; Fig. 9 is a side elevation of the bracket shown in Fig. 8; Fig. 10 is a diagrammatic plan view of a modified form of bracket and Fig. 11 shows a modified form of switch-box ear.

Referring to Figs. 1, 2, 3, 6, and 7, the bracket is formed from a U-shaped sheet metal blank 1, having arms or leaves whose combined width is equal to the space between them. By forming the bracket members from a blank of such proportions, the blanks may be punched from a single sheet as shown in Fig. 7, wherein it will be seen that the waste metal is negligible, and if the blanks were formed by a rotary die from a continuous sheet there would be no waste.

Referring more particularly to Figs. 1, 2 and 3, it will be seen that the bracket consists of a pair of support members 2 and 3 each formed from a blank having the same size and shape, proportioned as above stated, the support members 2 consisting of an end fastening plate 4 having two integral arms or leaves 5 which project at right angles from the end plate 4 and are spaced apart. The leaves 5 are curled rearward along their inside edges, as shown at 6, Figs. 1 and 3, the curled edge serving to stiffen the leaves and at the same time provide a socket into which the leaves of the support member 3 may telescope when the two parts of the bracket are assembled.

The support member 3 consists of an end fastening plate 7 and is provided with integral arms or leaves 8, which are bent at right angles to the end plate 7 and spaced apart similarly to the leaves 5. The inner edges of the leaves 8 are curled backward as at 9, Fig. 3, thereby stiffening the support and providing a shape that snugly fits into the curled portion of the leaves 5, so that when the leaves of the support members are telescoped a rigid bracket is formed that may be extensible in length so that it can be secured between the wall studding of a house regardless of variations in the spacings of the studding.

The end plates 4 and 7 are provided with holes 10 through which nails 11 may be driven into the studding thereby securely fastening the bracket to the wall.

For the purpose of securing the switch or terminal boxes to the bracket, the leaves 5 of the support member 2 are provided with a series of projections or lugs 12 which are struck up out of the front face of the leaves and are therefore integral therewith. The manner of their use to secure the boxes to the bracket will be hereinafter described. The leaves 8 of the support member 3 are provided with a series of rectangular holes 13, having a slightly greater space between them than the projections 12. It follows therefore that there will always be a hole 13 practically alined with a lug 12 regardless of the relative position of the support members with respect to each other, and to secure the support members against endwise movement or separation, the lugs 12ª, which are found to aline with certain of the holes 13, are pushed and bent backward through the holes 14 in the leaves 5 formed when the lugs 12 were struck up, and through the holes 13.

When it is desired to secure a bracket to the wall, the member 2 is first nailed securely to one of the wall studs, while the member 3 is telescoped within it; the end plate 7 is then moved until it almost touches the stud 15. A lug 12 on each leaf 5 is then punched through one of the holes 13 in each leaf 8, thereby locking the supporting members against separation. A nail is then driven through the central hole of the plate and finally nails are driven through the remaining holes adjacent the leaves thereby putting the bracket members under tension and therefore making a very rigid structure. It is not necessary to secure the members together in the manner just described as the material is sufficiently stiffened by the rolled edges to provide a perfectly rigid support.

Referring to Fig. 2 it will be seen that the lower leaf 5 is of slightly greater length than the upper leaf 5 for the purpose of facilitating the assembly of the support members. The leaves 8 of the member 3 are of equal length and therefore when it is desired to assemble the members, one of the leaves 8 first engages the end of the longer leaf 5 and being guided thereby it is a simple matter to put the remaining leaves together. To further facilitate the assembly of the members, the ends of the leaves 5 are expanded at 16, Figs. 4 and 5, so that the ends of the leaves 8 may readily be inserted.

In Figs. 2 and 3 the bracket is shown applied to the wall studding and carrying the switch or terminal boxes 17 and 18. The boxes usually comprise a pressed metal box structure having detachable sides 19 and ends 20 connected by bottom portions 21. The ends and bottoms are usually provided with holes 22 through which the electric wire terminals enter the box. Electric switches, plug terminals and other electrical apparatus not shown may be mounted in the box, certain operative parts being accessible for operation from the face of the wall through holes provided in suitable metal plates, not shown, mounted flush with the plaster.

Heretofore it has usually been the custom to nail two wooden cleats between the wall studs for supporting the box, the box being supported by means of ears located on the ends of the box similar to the ears 23 on the boxes 17 and 18. The ears are supplied with a couple of holes through which screws were secured to the wooden cleats thereby securing the box to the wooden cleats. The electrician heretofore was required to find suitable lumber, saw it into proper measured lengths, nail the cleats in place between the studs, after first having nailed a backing strip on each stud to support the cleats, and then finally screw the box to the cleats. Under such conditions the cleats are usually out of line and not properly spaced from the face of the wall, therefore necessitated considerable adjustment of the box on the cleats, and finally adjustment of the switch or plug terminal within the box. Considerable time is wasted in putting up wooden cleats and in adjusting the box and switch, and the adjustable metal bracket saves time in applying to the wall, and when positioned it is not necessary to adjust the boxes, because the end plates 4 and 7, Figs. 1, 2 and 3, are made of a standard predetermined width, so that when their front edge is flush with the wall stud the bracket is in true alinement and in proper position to locate the box in the proper position with respect to the face of the wall. After the box has been placed upon the improved bracket no further adjustments are necessary.

To secure the box to the improved bracket all that is necessary is to place the box between the leaves so that the lugs 12 project through the holes 24, provided in the supporting ears 23, and then bend up the lugs 12 with the screw driver or other implement until they engage the ears as shown in Figs. 2 and 3, an operation which consumes considerably less time than driving four screws for each box.

Heretofore it has usually been the custom, when it was desired to "gang" a number of boxes in a row, to provide the boxes with certain latches and screws to hold them together or in "ganged" relation. The boxes are usually "ganged" in the shop and carried to the house and there screwed to the bracket, the putting together of the various latches and screws requiring considerable time. Referring to Fig. 2 it will be seen that boxes without special "ganging" latches and screws may be "ganged" upon the bracket before the bracket is placed in the wall, and then all that remains to be done in completing the mounting of the box in the wall is the driving of a few nails.

Boxes that do not have "ganging" latches and screws are simpler to manufacture and therefore are less expensive than boxes requiring special "ganging" devices.

Referring to Fig. 2, the ears 23 are provided with two projections 25 spaced apart and having perforation 24 therethrough for receiving the lugs 12 which are so spaced that the projections 25 fit between the lugs 12 with a lug 12 passing through the hole. The lugs 12 between the projections just engage the outer edges of the ears 23 and serve also to hold the box in position, although such lugs 12 are not bent down. It is obvious that an open end slot 24', Fig. 11 might be substituted for the holes 24, and the lugs then bent toward the box to secure the box in position.

Referring to Figs. 8 and 9 a modified form of bracket is shown which is formed from a straight strip of sheet metal, and therefore there is no waste material. Fig. 8 shows an end view of one of the support members which consists of a pair of leaves 26 having both edges curled and provided upon one face with a series of lugs 27 struck up from the metal strip for holding the box upon the bracket.

The operation of the modified bracket is the same in all respects as the operation of the previously described bracket, the difference being merely one of construction and method of manufacture.

It is obvious that the two supporting members constituting a bracket, may be made in the form of counter-parts as shown in Fig. 10 and therefore be interchangeable by having one leaf 5' formed like the leaf 5 and the other leaf 8' of the same supporting member formed similar to the leaf 8 on the member 3. Two like supporting members could be then assembled into a complete bracket.

It is obvious that a variety of forms of brackets can be made without departing from the spirit of the invention, and the invention is not limited to the specific forms herein shown and described.

What I claim is:

1. A bracket for electric fixtures comprising a pair of spaced metal rods connected at their ends and adapted to be secured to a wall, and means carried by each rod for separately engaging an electrical fixture and supporting it between the rods.

2. A bracket for electric fixtures comprising a pair of spaced extensible rods connected at their ends and adapted to be secured between the wall studding, and means carried by the rods for securing an electrical fixture between the rods.

3. A wall bracket for electrical fixtures comprising a pair of spaced rods adapted to be secured between the wall studding, each of the said rods consisting of two sections adapted to telescope one within the other, the outer section being provided with means for securing an electrical fixture between the rods.

4. A wall bracket for electrical fixtures comprising a pair of spaced bars, means on each bar for separately securing an electrical fixture between the bars, and means connecting the ends of the bars adapted to be secured to the wall.

5. A wall bracket for electrical fixtures comprising a pair of spaced bars stamped from sheet metal and connected at one end by a portion of the sheet metal, the width of the material in each bar being substantially half the distance between the adjacent edges of the bars when the bars are flat.

6. A wall bracket for electrical apparatus comprising a pair of telescoping sheet metal support members, the outside member being provided with a series of struck up projections spaced apart for securing the electrical apparatus to the bracket and the inside member being provided with a series of holes adapted to receive the projections when bent toward the inside member for preventing separation of the support members.

7. A wall bracket for electrical apparatus comprising a pair of telescoping sheet metal support members, the outside member being provided with a series of struck up projections spaced apart for securing the electrical apparatus to the bracket and the inside member being provided with a series of holes of different spacing than the projections adapted to receive the projections when bent toward the inside member for preventing separation of the support members.

8. A wall bracket for electrical fixtures comprising a pair of spaced metal rods adapted to be secured to the wall and receive a fixture thereon, integral securing means carried by the rods projecting forwardly from the rods and bent rearwardly around the fixture adjacent the extremities thereof into engagement with the fixture forward of the rear bracket engaging face thereof whereby the fixture is held against removal forwardly.

9. A wall bracket for electrical fixtures comprising a pair of spaced metal rods adapted to be secured to the wall and receive a fixture thereon, securing means carried by the rods projecting forwardly from the rods and extending around the fixture adjacent the extremities thereof and turned rearwardly into engagement with the fixture forward of the rear bracket engaging face thereof whereby the fixture is held against removal forwardly.

10. A bracket for supporting electrical fixtures upon a wall, comprising a pair of spaced metal rods adapted to be secured adjacent their ends to the wall studding so that a fixture may be supported between the rods, each provided with a plurality of spaced projections adapted to receive a portion of the fixture between the projections when the fixture is inserted between the rods whereby the fixture is held against movement along the rods, and means for preventing the accidental removal of the fixture in a forward direction.

11. The combination with a bracket for supporting electrical fixtures having a portion thereof bent forwardly and then rearwardly so as to engage a fixture forward of the rear bracket engaging face thereof to prevent removal of the fixture in a forward direction, of a projection adapted to be engaged by the fixture to prevent its movement along the bracket.

12. A bracket for supporting electrical fixtures upon a wall comprising a pair of spaced metal rods adapted to be secured adjacent their ends to the wall studding so that a fixture may be supported between the rods at a point between the ends of the rods, provided with forwardly extending projections forming slots therebetween for receiving a portion of an electrical fixture whereby the fixture is held against movement along the rod by the projections, and means for preventing the accidental removal of the fixture in a forward and rearward direction.

13. The combination with an electrical fixture having attaching means at opposite ends of the fixture, of a pair of spaced bracket members adapted to straddle the end of the fixture to support it between the bracket and provided with outwardly directed spaced projections adapted to coöperate with the attaching means on the fixture whereby movement of the fixture along the rods is prevented and removal of the fixture by outward movement thereof is permitted, the said bracket members being provided at their ends with means whereby they may be secured to the wall.

In testimony whereof I have hereunto signed my name in the presence of the two subscribed witnesses.

JULIAN H. KENDIG.

Witnesses:
M. L. JONES,
ARCHWORTH MARTIN.